US011858091B2

(12) United States Patent
Eiseler et al.

(10) Patent No.: US 11,858,091 B2
(45) Date of Patent: Jan. 2, 2024

(54) APPARATUS AND METHOD FOR RECIRCULATING FLUIDS

(71) Applicant: Mega Fluid Systems, Inc., Tualatin, OR (US)

(72) Inventors: Robert Eiseler, Dundee, OR (US); Koh Murai, Yamhill, OR (US); Michael Perkins, II, Beaverton, OR (US)

(73) Assignee: Mega Fluid Systems, Inc., Tualatin, OR (US)

( * ) Notice: Subject to any disclaimer, the term of this patent is extended or adjusted under 35 U.S.C. 154(b) by 310 days.

(21) Appl. No.: 16/723,547

(22) Filed: Dec. 20, 2019

(65) Prior Publication Data

US 2020/0171622 A1 Jun. 4, 2020

Related U.S. Application Data

(63) Continuation of application No. PCT/US2019/063266, filed on Nov. 26, 2019.

(Continued)

(51) Int. Cl.

*B24B 57/00* (2006.01)
*B24B 57/02* (2006.01)
*B01F 23/50* (2022.01)
*B01F 25/51* (2022.01)
*B01F 35/21* (2022.01)
*B01F 25/00* (2022.01)
*B01F 101/58* (2022.01)

(52) U.S. Cl.

CPC .............. *B24B 57/02* (2013.01); *B01F 23/59* (2022.01); *B01F 25/51* (2022.01); *B01F 35/2113* (2022.01); *B01F 35/21112* (2022.01); *B01F 2025/931* (2022.01); *B01F 2101/58* (2022.01)

(58) Field of Classification Search

CPC ..... B24B 57/02; B01F 2025/931; B01F 25/51

See application file for complete search history.

(56) References Cited

U.S. PATENT DOCUMENTS 4,239,512 A * 12/1980 Dobias .................. B01D 45/06 454/52
4,421,874 A 12/1983 Seefluth (Continued)

FOREIGN PATENT DOCUMENTS

CN 201992249 9/2001
CN 2561501 Y 7/2003

(Continued)

OTHER PUBLICATIONS

International Search Report and Written Opinion of the International Searching Authority for PCT/US2019/063266, dated Mar. 25, 2020, 13 pages.

*Primary Examiner* — Anshu Bhatia

(74) *Attorney, Agent, or Firm* — Lando & Anastasi, LLP

(57) ABSTRACT

An apparatus for recirculating fluids in semiconductor systems. The apparatus including a base portion, an inlet portion coupled to a first end of the base portion, and a nozzle coupled to a second end of the base portion. The nozzle including a helical groove extending from a position near a nozzle base portion to a position near a tip of the nozzle portion. The helical groove extending from an exterior surface through the nozzle portion to an interior surface of the nozzle portion. Methods of using the apparatus in a semiconductor recirculation system are also disclosed.

12 Claims, 15 Drawing Sheets

Related U.S. Application Data

(60) Provisional application No. 62/892,847, filed on Aug. 28, 2019, provisional application No. 62/774,156, filed on Nov. 30, 2018.

(56) References Cited

U.S. PATENT DOCUMENTS

| | | | | |
|---|---|---|---|---|
| 5,129,956 | A | 7/1992 | Pickering | |
| 2002/0006876 | A1 | 1/2002 | Hongo | |
| 2005/0145166 | A1 | 7/2005 | Seo | |
| 2007/0144602 | A1 | 6/2007 | Henkin | |
| 2010/0224256 | A1* | 9/2010 | Tseng | G01F 11/28<br>137/565.29 |
| 2012/0216840 | A1 | 8/2012 | Nishigaki | |
| 2013/0109612 | A1* | 5/2013 | Corona, III | C11D 1/62<br>510/516 |

FOREIGN PATENT DOCUMENTS

| | | | |
|---|---|---|---|
| EP | 0 984 166 | A1 * | 3/2000 |
| JP | 07103865 | | 4/1995 |
| TW | 200507941 | A | 3/2005 |
| TW | M282740 | U | 12/2005 |

* cited by examiner

100

APPARATUS AND METHOD FOR RECIRCULATING FLUIDS

CROSS REFERENCE TO RELATED APPLICATION

This application is a continuation of PCT/US2019/063266 filed on Nov. 26, 2019 and entitled Apparatus and Method for Recirculating Fluids, which claims priority benefit under 35 U.S.C. § 119(e) to U.S. Provisional Patent Application No. 62/892,847 filed Aug. 28, 2019 and U.S. Provisional Patent Application No. 62/774,156 filed Nov. 30, 2018, which are incorporated herein by reference in their entireties.

FIELD OF THE INVENTION

The present invention relates generally to an apparatus for recirculating fluids in the semiconductor industry. More specifically, but not exclusively, the present invention concerns an apparatus for use with semiconductor raw CMP slurries or similar materials to provide mixing to achieve a high degree of homogeneity, in a short period of time, with minimal to no detrimental effect on the slurry health of the delivered materials.

BACKGROUND OF THE INVENTION

Currently a mechanical mixer is inserted into a 55 gal (200 L) drum and used to supplement simple recirculation and maintain homogeneity of the solids and liquid in the drum (CMP polishing slurry). The use of a mechanical mixer can be detrimental to the slurry health by causing shearing of the particles in the mixture. Thus, what is needed is the elimination of addition of a mechanical mixer. In addition, the elimination of preliminary mixing via a roller or tumbler for the same drum and at least the ability to maintain homogeneity established by the roller/tumbler for extended periods of time while the material in the drum is in queue to be used.

SUMMARY OF THE INVENTION

Aspects of the present invention provide an apparatus for recirculating fluids in the semiconductor industry and a method of using the same.

In one aspect, provided herein is an apparatus, including a base portion, an inlet portion coupled to a first end of the base portion, and a nozzle member coupled to a second end of the base portion.

In another aspect, provided herein is method of recirculating fluids, including obtaining an apparatus. The apparatus including a base portion, an inlet portion, a coupler connecting the inlet portion to the base portion at a first end, and a nozzle member coupled to the base portion at a second end. The method may also include coupling the apparatus to a recirculation system. The method may further include passing a semiconductor slurry through the recirculation system and into a storage drum.

In yet another aspect, provided herein is a method of using an apparatus, including coupling an apparatus to a semiconductor recirculation system. The apparatus including a base portion, an inlet portion coupled to a first end of the base portion, and a nozzle coupled to a second end of the base portion, wherein the nozzle includes a helical groove. The method also including passing a slurry through the base portion of the apparatus and out of the nozzle into a storage container.

These, and other objects, features and advantages of this invention will become apparent from the following detailed description of the various aspects of the invention taken in conjunction with the accompanying drawings.

BRIEF DESCRIPTION OF DRAWINGS

The accompanying drawings, which are incorporated in and constitute a part of the specification, illustrate embodiments of the invention and together with the detailed description herein, serve to explain the principles of the invention. The drawings are only for purposes of illustrating preferred embodiments and are not to be construed as limiting the invention. It is emphasized that, in accordance with the standard practice in the industry, various features are not drawn to scale. In fact, the dimensions of the various features may be arbitrarily increased or reduced for clarity of discussion. The foregoing and other objects, features and advantages of the invention are apparent from the following detailed description taken in conjunction with the accompanying drawings in which.

DETAILED DESCRIPTION FOR CARRYING OUT THE INVENTION

Figure 1:
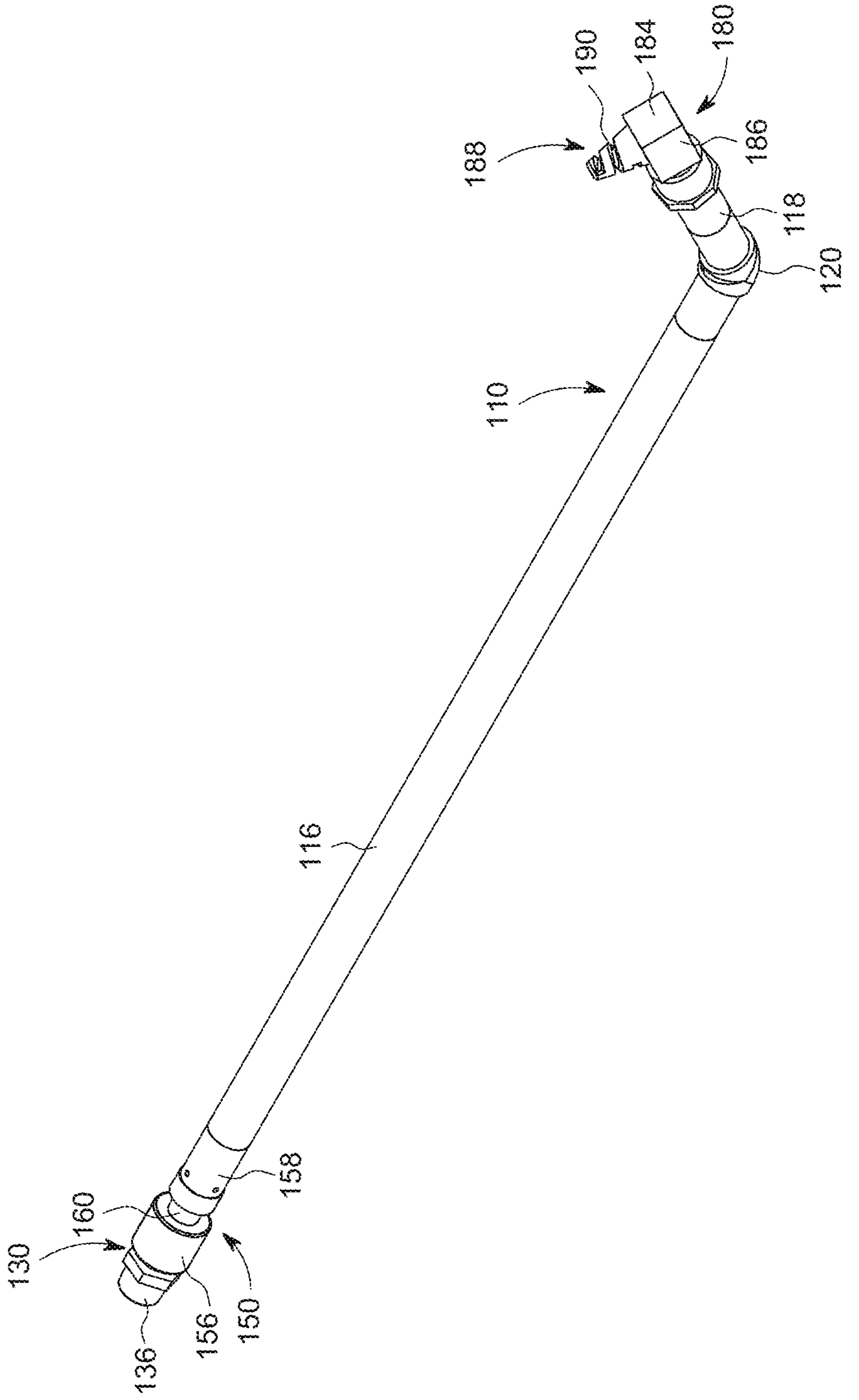
FIG. 1 is a perspective view of a mixing apparatus, in accordance with an aspect of the present invention.
Figure 2:
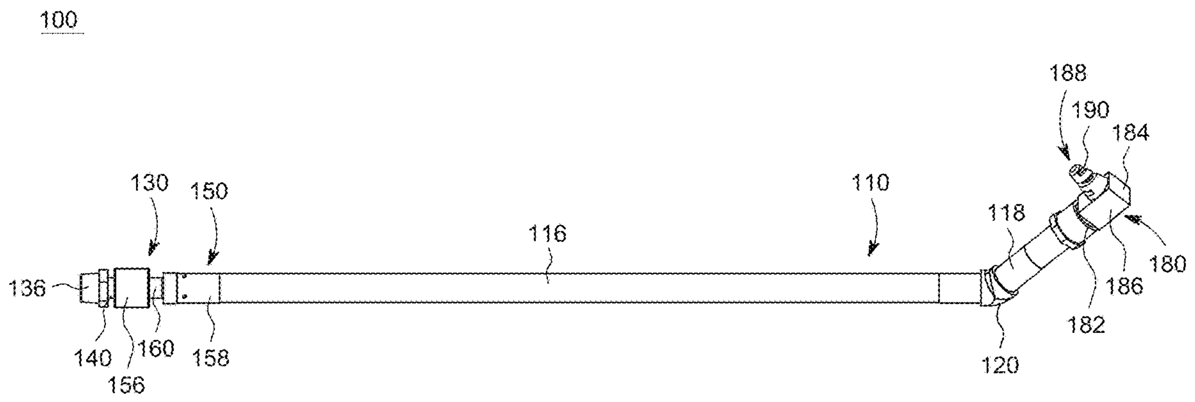
FIG. 2 is a side perspective view of the apparatus of FIG. 1, in accordance with an aspect of the present invention.
Figure 3:
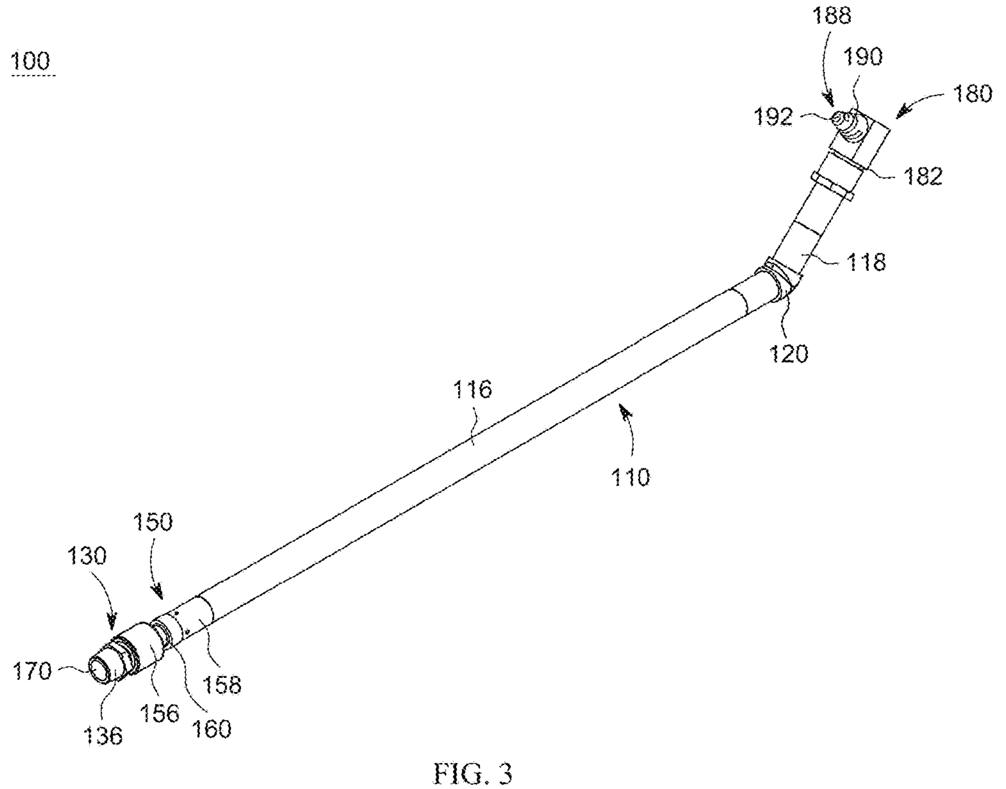
FIG. 3 is a top perspective view of the apparatus of FIG. 1, in accordance with an aspect of the present invention.
Figure 4:
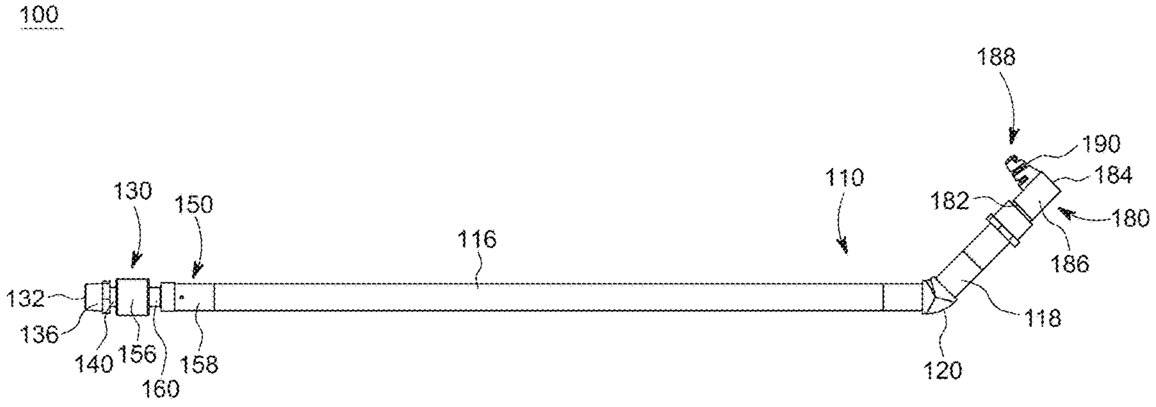
FIG. 4 is a first side view of the apparatus of FIG. 1, in accordance with an aspect of the present invention.
Figure 5:
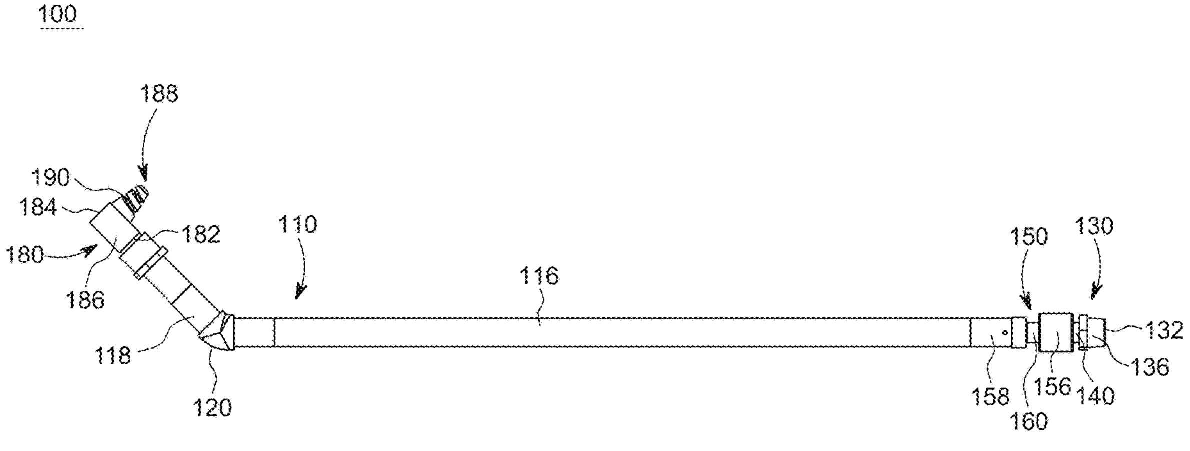
FIG. 5 is a second side view of the apparatus of FIG. 1, in accordance with an aspect of the present invention.
Figure 6:
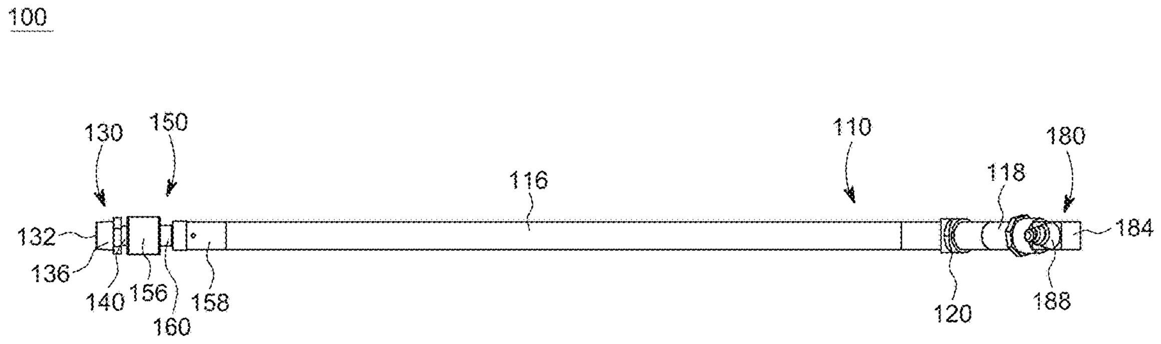
FIG. 6 is a top view of the apparatus of FIG. 1, in accordance with an aspect of the present invention.
Figure 7:
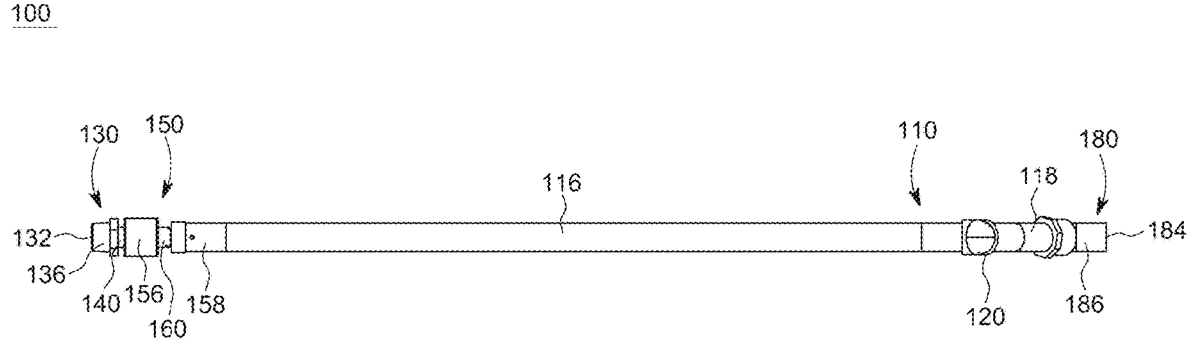
FIG. 7 is a bottom view of the apparatus of FIG. 1, in accordance with an aspect of the present invention.
Figure 9:
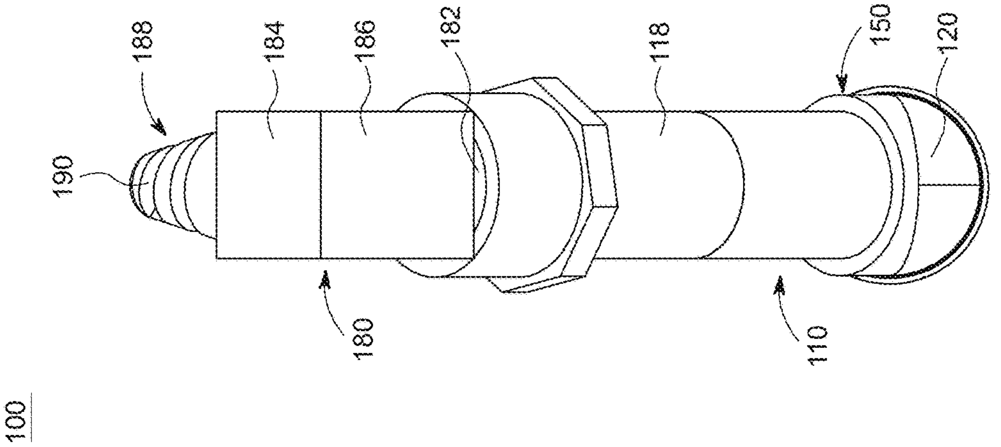
FIG. 9 is a second end view of the apparatus of FIG. 1, in accordance with an aspect of the present invention.
Figure 8:
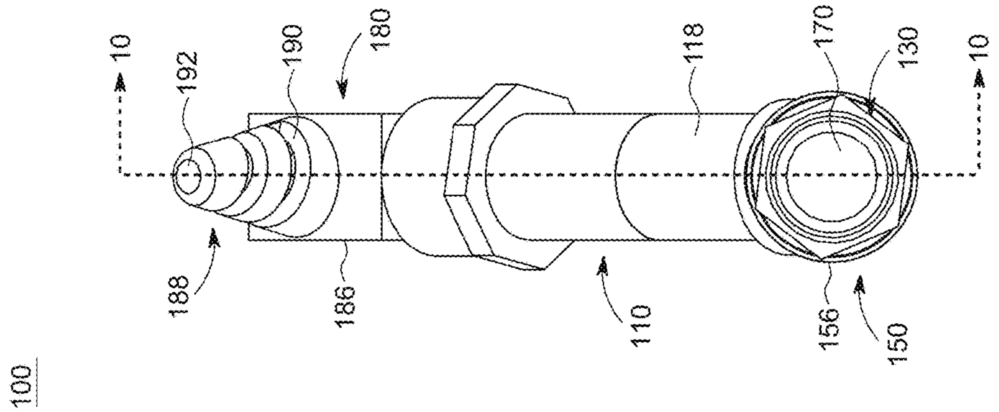
FIG. 8 is a first end view of the apparatus of FIG. 1, in accordance with an aspect of the present invention.
Figure 10:
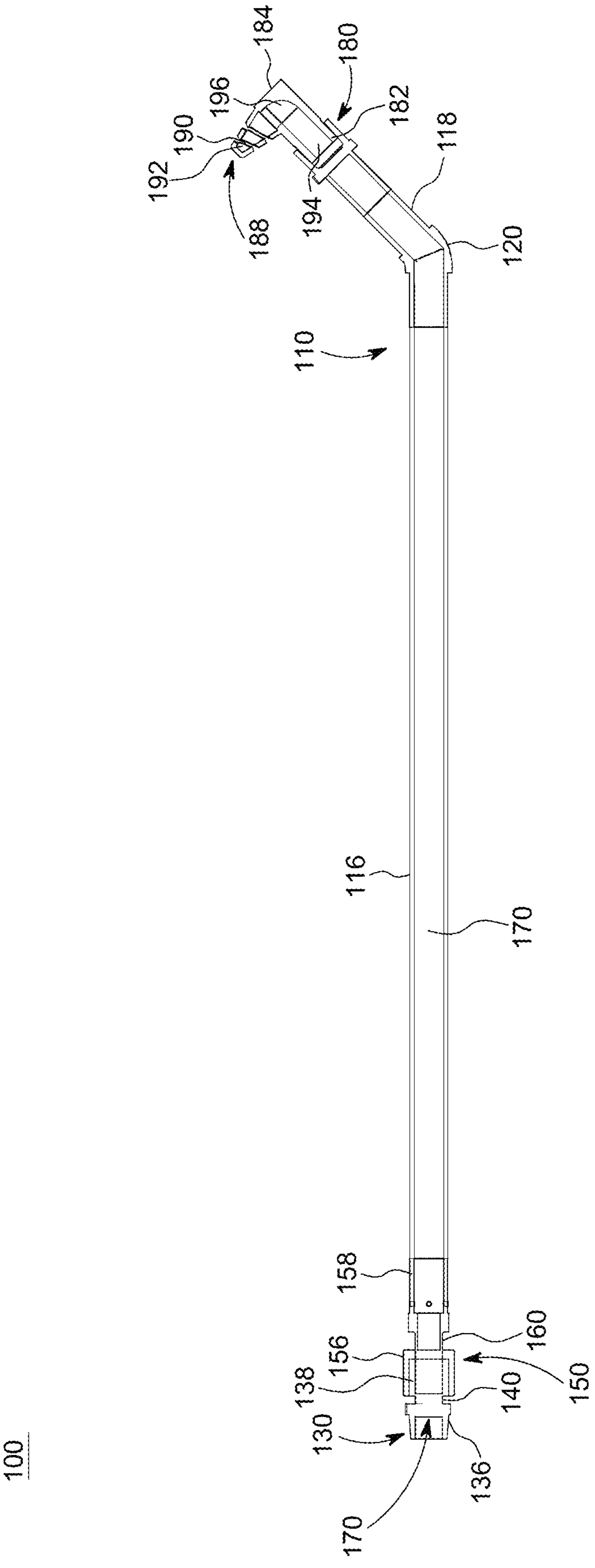
FIG. 10 is a cross-sectional view of the apparatus of FIG. 1 taken along line 10-10 of FIG. 8, in accordance with an aspect of the present invention.
Figure 11:
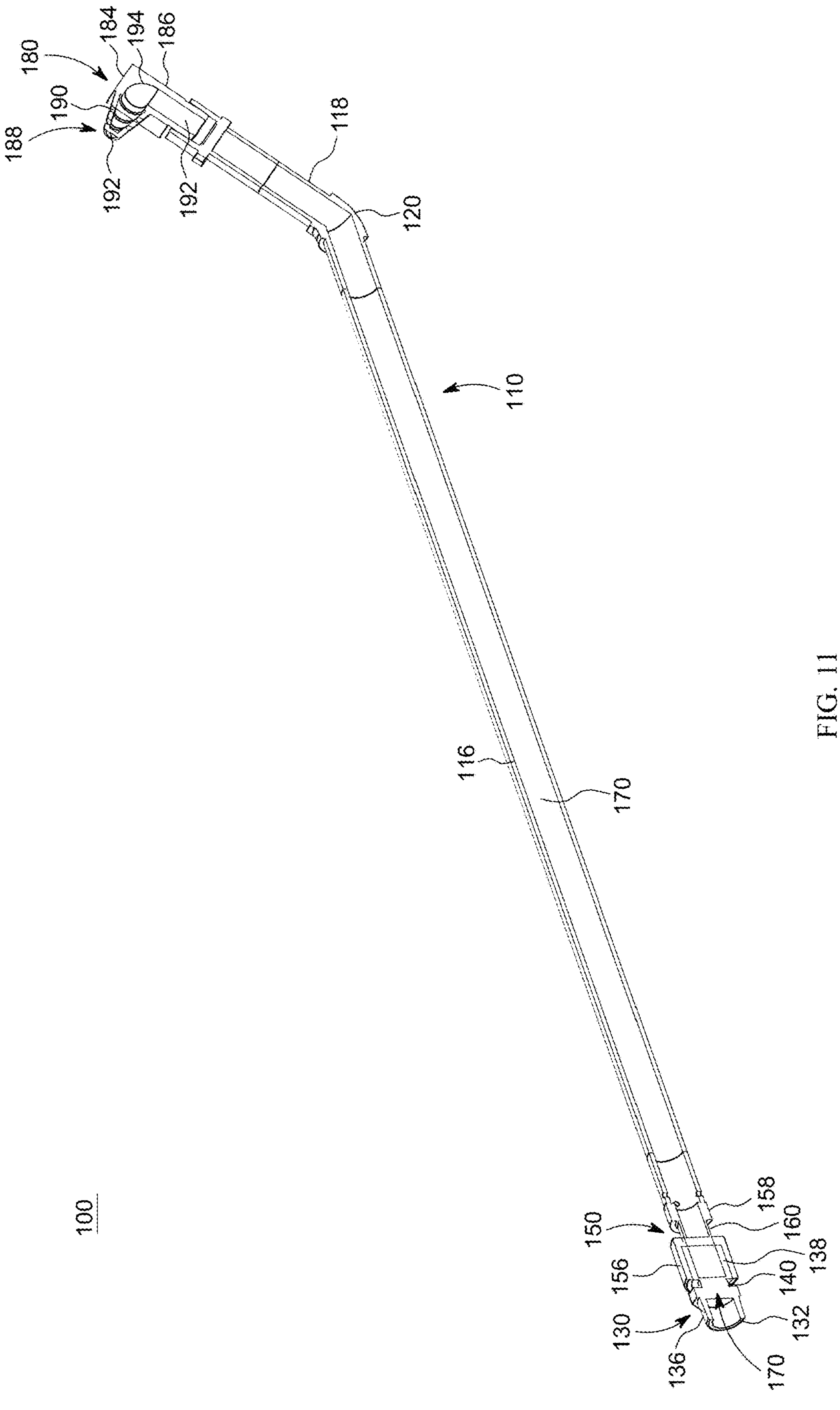
FIG. 11 is a perspective view of the apparatus shown in FIG. 10, in accordance with an aspect of the present invention.
Figure 12:
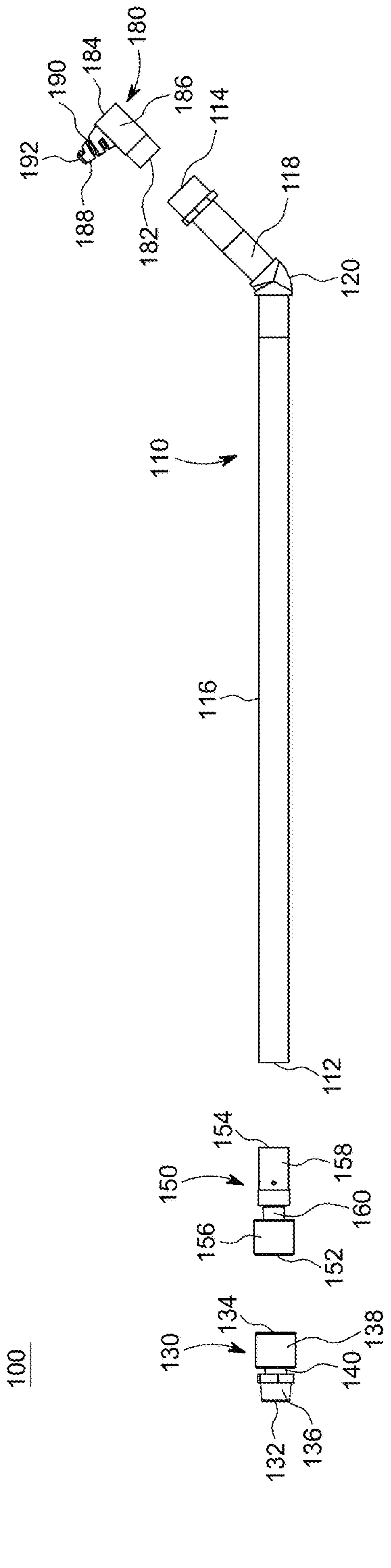
FIG. 12 is an exploded side view of the apparatus of FIG. 1, in accordance with an aspect of the present invention.
Figure 13:
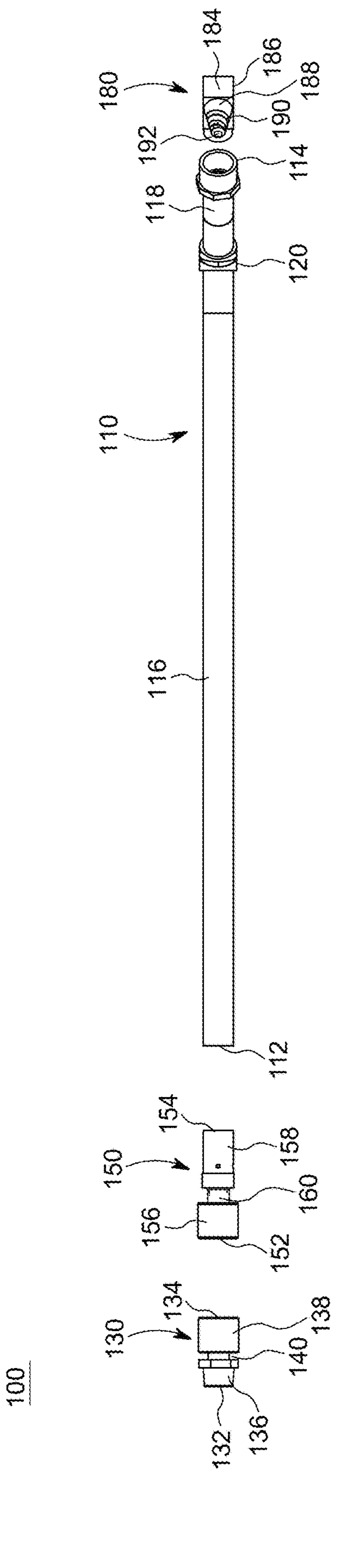
FIG. 13 is an exploded top view of the apparatus of FIG. 1, in accordance with an aspect of the present invention.
Figure 14:
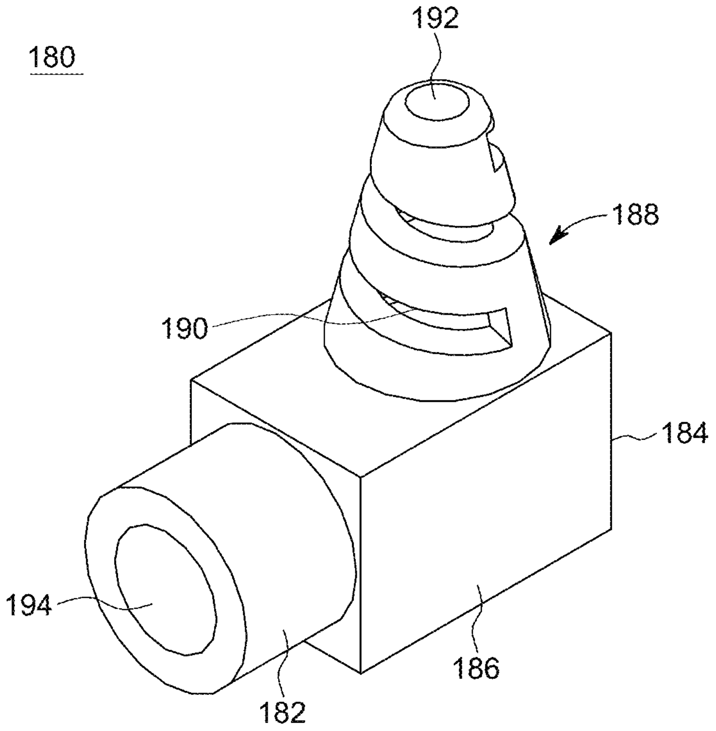
FIG. 14 is a perspective view of a nozzle of the apparatus of FIG. 1, in accordance with an aspect of the present invention.
Figure 15:
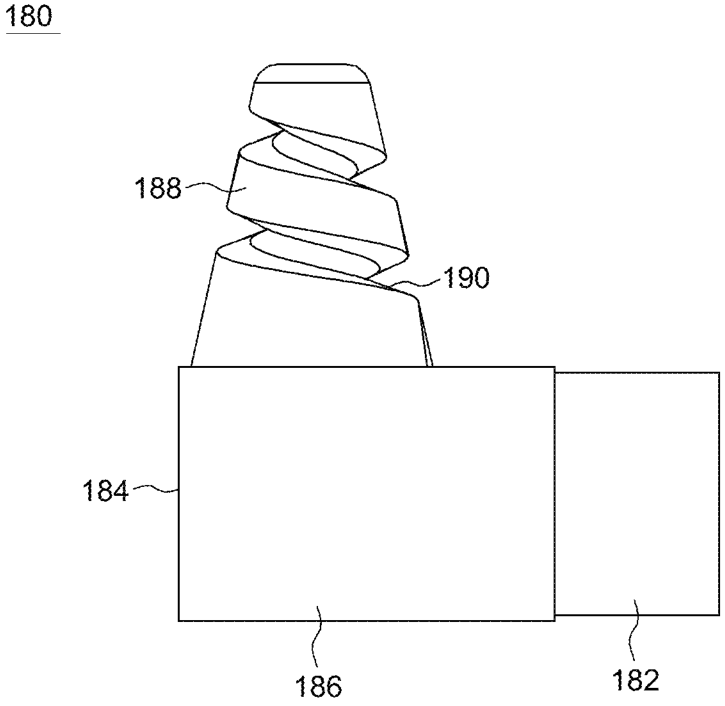
FIG. 15 is a first side view of the nozzle of FIG. 14, in accordance with an aspect of the present invention.
Figure 16:
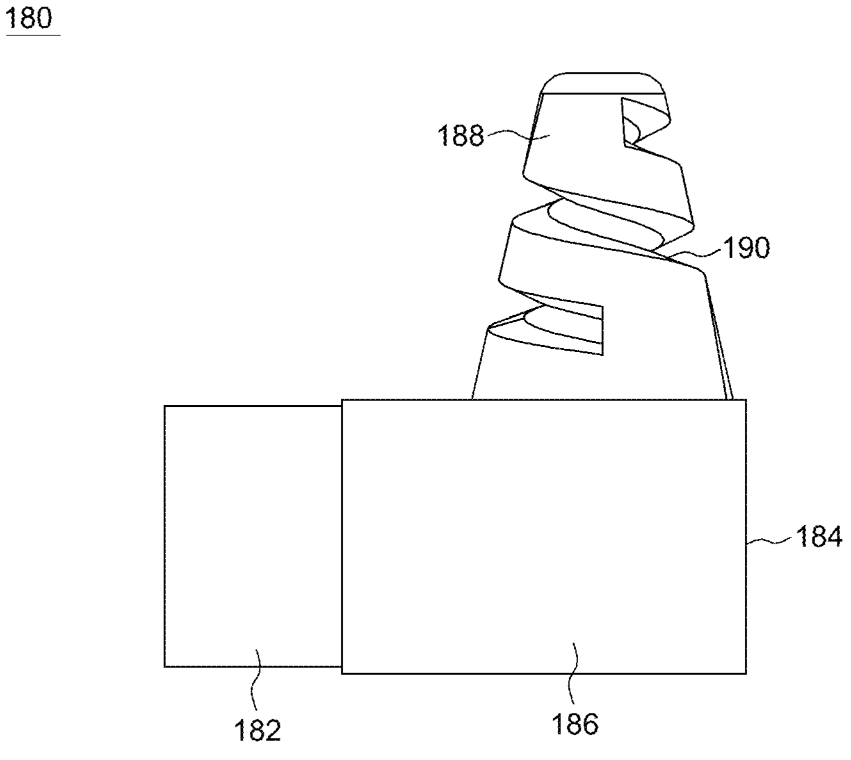
FIG. 16 is a second side view of a nozzle of FIG. 14, in accordance with an aspect of the present invention.
Figure 18:
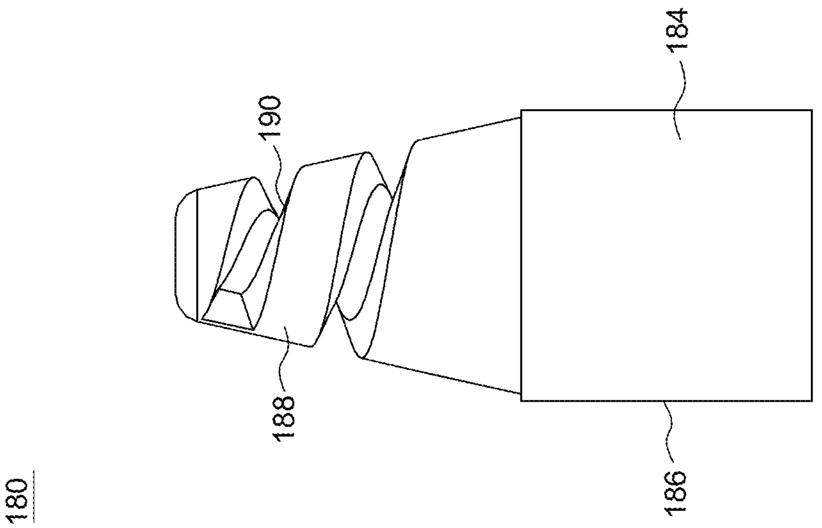
FIG. 18 is a second end view of the nozzle of FIG. 14, in accordance with an aspect of the present invention.
Figure 17:
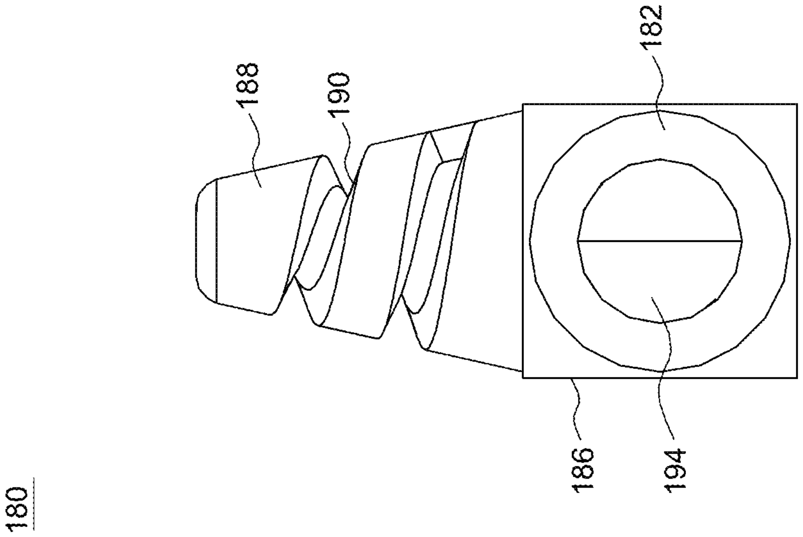
FIG. 17 is a first end view of the nozzle of FIG. 14, in accordance with an aspect of the present invention.
Figure 20:
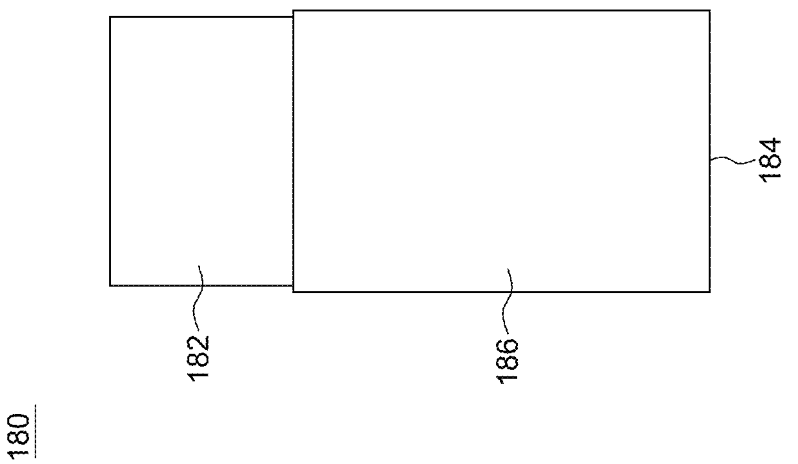
FIG. 20 is a bottom view of the nozzle of FIG. 14, in accordance with an aspect of the present invention.
Figure 19:
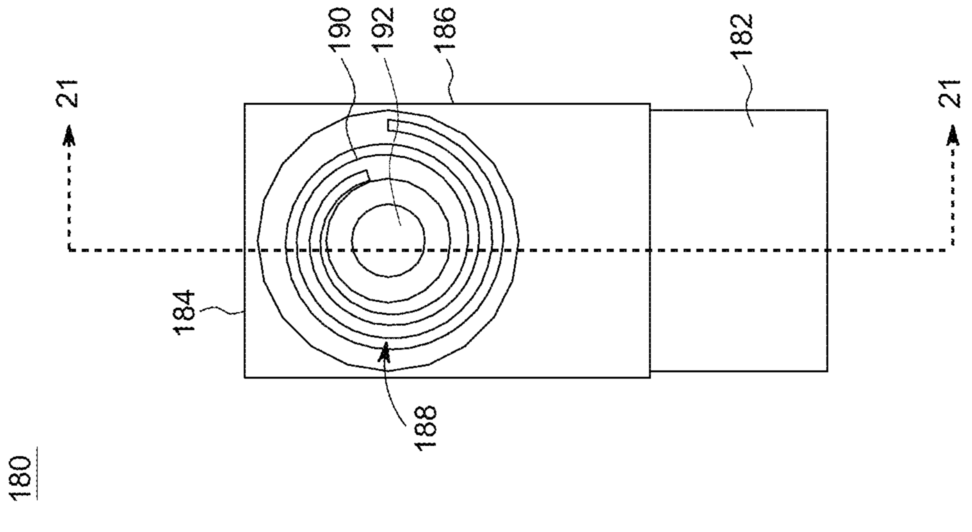
FIG. 19 is a top view of the nozzle of the apparatus of FIG. 14, in accordance with an aspect of the present invention.

Generally stated, disclosed herein is an apparatus for recirculating fluids in the semiconductor industry. Further, methods using the apparatus for recirculating fluids in the semiconductor industry are disclosed.

Referring to the drawings, wherein like reference numerals are used to indicate like or analogous components throughout the several views, and with particular reference to FIGS. 1-23, there is illustrated an exemplary embodiment of an apparatus 100 for recirculating fluids, for example, in the semiconductor industry. The apparatus 100 may include a base portion 110, an inlet portion 130, a coupler 150, and a nozzle member 180. The inlet portion 130 may be coupled to a first end 112 of the base portion 110 by the coupler 150. The nozzle member or nozzle portion 180 may be coupled to a second end 114 of the base portion 110. When the base portion 110, inlet portion 130, and coupler 150 are attached together a passageway 170 is formed extending through the apparatus 100. The base portion 110 may include a first portion 116, a second portion 118 and a connector 120 coupling the first portion 116 to the second portion 118. The first portion 116 may be, for example, longer than the second portion 118, as described in greater detail below with reference to FIG. 23. The connector 120 may be, for example, angled to position the first portion 116 at an angle with respect to the second portion 118.

The inlet portion 130 may include a first end 132 and a second end 134 that is connected to the coupler 150. The inlet portion 130 may also include a first portion 136, a second portion 138, and a connector 140 positioned between the first portion 136 and the second portion 138. The connector 140 may, for example, have a diameter smaller than the diameter of the first portion 136 and the diameter of the second portion 138. The first portion 136 may be secured to a recirculation system, as described in greater detail below with reference to FIG. 24. The first portion 136 may be, for example, tapered from the first end 132 to the connector 140. The second portion 138 may be received within a portion of the coupler 150. The second portion 138 may have, for example, a uniform diameter along the entire length of the second portion 138. Although not shown, in alternative embodiments, the second portion 138 may have, for example, different diameters or a varying diameter along the length of the second portion 138.

The coupler 150 may include a first end 152 and a second end 154 that is coupled to the first portion 116 of the base portion 110. The coupler 150 may also include a first portion 156, a second portion 158, and a connector 160 positioned between the first portion 156 and the second portion 158. The connector 160 may have a first outer diameter, the first portion 156 may have a second outer diameter, and the second portion 158 may have a third outer diameter. In an embodiment, the first outer diameter may be smaller than the third outer diameter and the second outer diameter may be larger than the first and third outer diameters. In addition, the first outer diameter of the connector 160 may be approximately the same size as the inner diameter of the interior engagement portions of the first portion 156 and the second portion 158. The interior engagement portions allow for the connector 160 to be inserted within the passageway of the first portion 156 and the second portion 158 while aligning the passageway of the connector 160 with the passageways of the first portion 156 and second portion 158. The first portion 156 couples to the first end 112 of the base portion 110. The second portion 158 engages the first portion 116 of the base portion 110 at the first end 112.

With continued reference to FIGS. 1-13 and as best seen in FIGS. 14-22, the nozzle member 180 may include a first end 182 and a second end 184. The nozzle member 180 may also include a base portion 186, a nozzle portion 188, and an inlet 194. The nozzle portion 188 may, for example, extend away from the exterior surface of the base portion 186 between the first end 182 and the second end 184 of the nozzle member 180. In the depicted embodiment, the nozzle portion 188 is positioned near the second end 184 of the base portion 186. The nozzle portion 188, for example, tapers as it extends away from the base portion 186 to a tip 192. The nozzle portion 188 includes a helical channel or groove 190 extending from a position near the base portion 186 to a position near the tip 192 of the nozzle portion 188. The helical groove 190 extends from an exterior surface through the nozzle portion 188 to an interior surface. The nozzle member 180 may further include an opening 196 extending through the interior of the nozzle member 180. The first end 182 of the nozzle member 180 may have an outer diameter sized to be received within the inner diameter of the second portion 118 at the second end 114 of the base portion 110. The inner diameter of the second portion 118 may include an interior engagement portion for receiving the first end 182 of the nozzle member 180 to align the interior passageway 170 of the base portion 110 with the interior surface of the opening 196.

Figure 21:
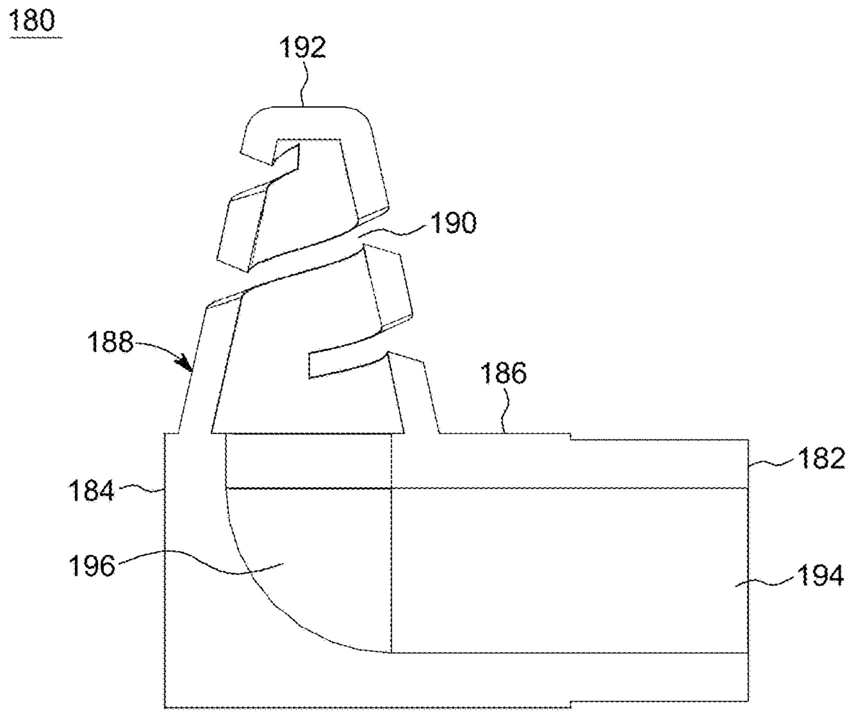
FIG. 21 is a cross-sectional view of the nozzle of FIG. 14 taken along line 21-21 of FIG. 19, in accordance with an aspect of the present invention.
Figure 22:
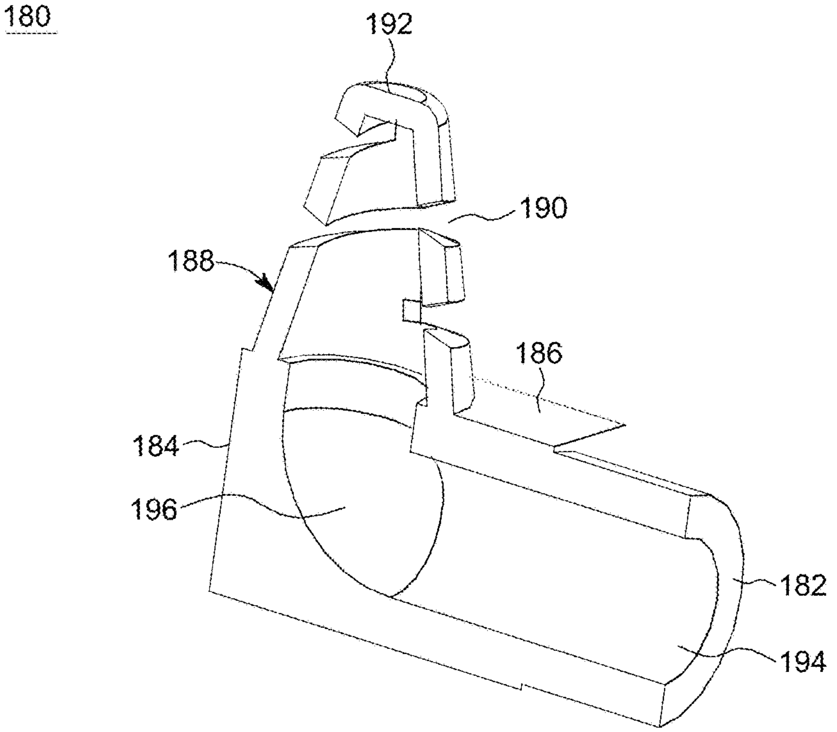
FIG. 22 is a perspective view of the nozzle of FIG. 21, in accordance with an aspect of the present invention.

As shown in FIGS. 21 and 22, the inlet 194 engages the opening 196 extending through the base portion 186. The opening 196 connects the inlet 194 to the helical groove 190 allowing fluid to mix as it passes through and out of the nozzle member 180. In addition, the inlet 194 is aligned with and engages the passageway 170 to allow, for example, a slurry to pass through the inlet portion 130, coupler 150, and base portion 110 and into the nozzle member 180. The nozzle portion 188 allows for, for example, an upward swirl of the slurry in a 360 degree or radial pattern. The upward swirl created by the nozzle portion 188 minimizes or eliminates the slurry shear caused by mixing or recirculating the slurry. In addition to the swirl created by the nozzle portion 188, the angle between the first portion 116 and second portion 118 of the base portion 110 may also minimize or eliminate the slurry shear caused by mixing or recirculating the slurry.

Figure 23:
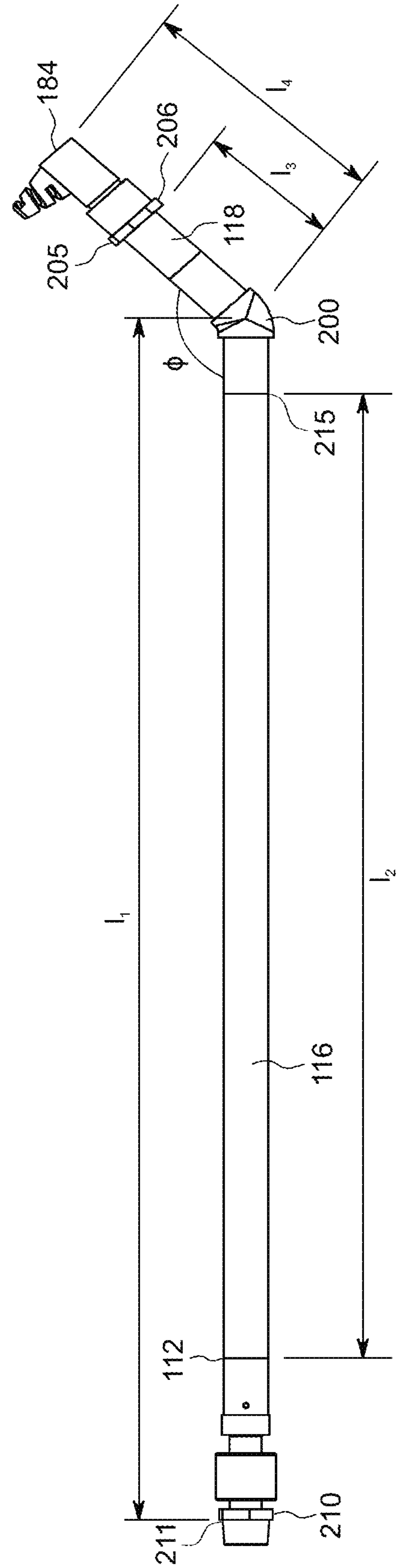
FIG. 23 is the first side view of FIG. 4 showing the dimensions of portions of the apparatus FIG. 1, in accordance with an aspect of the present invention.

Referring now to FIG. 23, the dimensions of portions of the apparatus 100 are shown. Further to the description of the apparatus 100 above, the first portion 136 of the inlet portion 130 may also include a first tool engagement portion 210 with a first engagement edge 211. With continued reference to FIG. 23, the connector 120 may include a connector midpoint 200. The apparatus 100 may include a first length $l_1$ extending between the first engagement edge 211 and the connector midpoint 200. The first length $l_1$ may range between, for example, approximately twenty (20) inches and approximately forty (40) inches. More specifically, the first length $l_1$ may range between approximately twenty-two (22) inches and approximately thirty-eight (38) inches. In some embodiments, the first length $l_1$ may be approximately twenty-three (23) inches, approximately thirty-one (31) inches, approximately thirty-two (32) inches, approximately thirty-five (35) inches, or approximately thirty-seven (37) inches.

With continued reference to FIG. 23, the first portion 116 of the base portion 110 may include a second length $l_2$. The second length $l_2$ may extend between the first end 112 of the base portion 110 and a second end 215 of the first portion 116. The second length $l_2$ may range between, for example, approximately fifteen (15) inches and approximately thirty-five (35). More specifically, the second length $l_2$ may range between approximately sixteen (16) inches and approximately thirty-two (32) inches. Still more specifically, the second length $l_2$ may be approximately seventeen (17) inches, approximately twenty-five (25) inches, approximately twenty-six (26) inches, approximately twenty-eight (28) inches, or approximately thirty-one (31) inches.

The ratio between the first length $l_1$ and the second length $l_2$ (i.e., $l_1/l_2$) may range between, for example, approximately 1.1 to approximately 1.5. More specifically, the ratio between the first length $l_1$ and the second length $l_2$ (i.e., $l_1/l_2$) may range between approximately 1.2 to approximately 1.4. Still more specifically, the ratio between the first length $l_1$ and the second length $l_2$ (i.e., $l_1/l_2$) may be approximately 1.2, approximately 1.3, or approximately 1.4.

As shown in FIG. 23, the connector 120 may produce angle Ø between the first portion 116 and the second portion 118. The angle Ø may range from, for example, approximately 90 degrees to approximately 160 degrees. More specifically, the angle Ø may range from, for example, approximately 120 degrees to approximately 150 degrees. Still more specifically, the angle Ø may be approximately 90 degrees, approximately 112 degrees, approximately 135 degrees, or approximately 157 degrees.

With continued reference to FIG. 23, the second portion 118 of the base portion 110 may include a second tool engagement portion 205. The second tool engagement portion 205 may include a second engagement edge 206. The apparatus 100 may include a third length $l_3$ extending between the second engagement edge 206 and the connector midpoint 200. The third length $l_3$ may range between, for example, approximately two (2) inches and approximately four (4) inches. More specifically, the third length $l_3$ may be approximately two (2) inches, approximately 2.5 inches, approximately three (3) inches, approximately 3.5 inches, or approximately four (4) inches.

A fourth length $l_4$ between the second end 184 of the nozzle portion 180 and the connector midpoint 200 is shown in FIG. 23. The fourth length $l_4$ may range between, for example, approximately five (5) inches and approximately seven (7) inches. More specifically, the fourth length $l_4$ may be, for example, approximately five (5) inches, approximately 5.5 inches, approximately six (6) inches, approximately 6.5 inches, or approximately seven (7) inches.

It is contemplated that some or all components of the apparatus 100 may be partially or entirely made with fluoropolymers, such as, perfluoroalkoxy alkanes (PFA), polytetrafluoroethylene (PTFE), fluorinated ethylene propylene (FEP), or alternative materials with like properties. The components of the apparatus 100 may, for example, all be made of only one material, each be made of a different material, each be made of a combination of material, or each be made either of only one material or a combination of materials.

Although not shown, a mixing system may include more than one the apparatus 100. For example, the mixing system may include a first apparatus 100 and a second apparatus 100 which each connect to an end of a recirculation line. In further embodiments, the mixing system may include any number of apparatus 100 coupled to the end of the recirculation line. Each apparatus 100 in the mixing system may have the same or a different length to the remaining apparatus 100.

Figure 24:
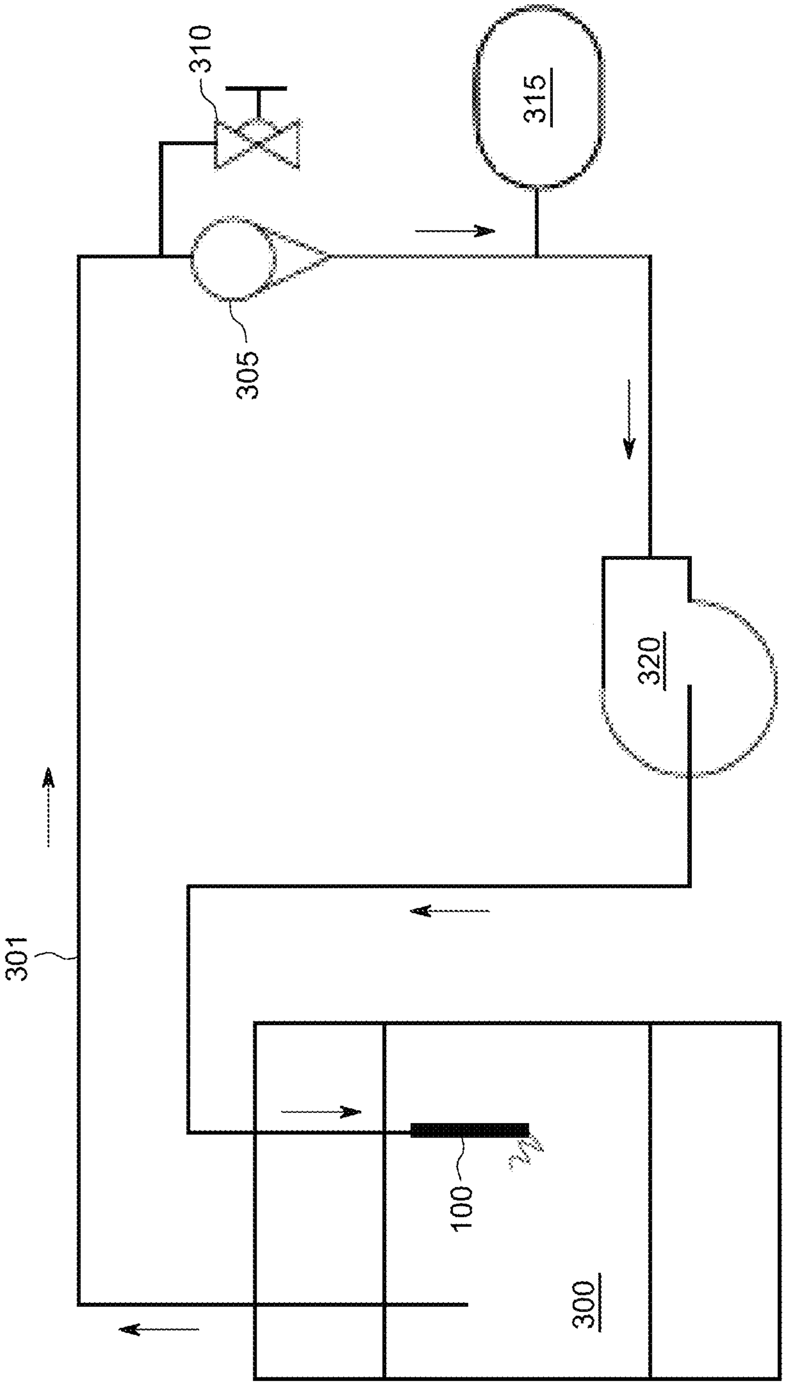
FIG. 24 is a schematic depiction of a system including the apparatus of FIG. 1, in accordance with an aspect of the present invention.

A method of recirculating fluids is also disclosed and includes obtaining an apparatus 100. The apparatus including a base portion 110, an inlet portion 130, a coupler 150 connecting the inlet portion 130 to the base portion 110 at a first end 112, and a nozzle member 180 coupled to the base portion 110 at a second end 114. The method may also include coupling the apparatus 100 to a recirculation system, such as shown in FIG. 24. The method may further include passing a semiconductor slurry through the recirculation system and into a storage drum 300.

As shown in FIG. 24, the recirculation system may include a recirculation loop 301, which draws a slurry out of a storage drum 300. The recirculation system may also include a pump 320, a sample valve 310, a rotameter 305, and a pressure gauge 315 positioned along the recirculation loop 301. The slurry may be drawn out of the storage drum 300 by the pump 320. The slurry may then travel through the recirculation loop 301 and be deposited back into the storage drum 300 through apparatus 100. As the slurry travels through the recirculation loop 301, the slurry health and thoroughness of mixing may be checked by periodic sampling of the recirculating slurry via the sample valve 310 positioned within the recirculation loop 301. In addition, the volumetric flow rate may be monitored by a rotameter 305 positioned within the recirculation loop 301. Further, the flow pressure of the recirculation system may be monitored by a pressure gauge 315, also positioned within the recirculation loop 301. Although not shown, it is also contemplated that the apparatus 100 may include multiple second portions 118 each with a nozzle portion 180 to increase the mixing of the slurry.

The method of recirculating fluids using the apparatus 100 to maintain semiconductor slurry health. Slurry health, as used herein, refers to the physical properties of the particles in the raw slurry or blended slurry. These include the particle counts by size (i.e. 200 nm, 500 nm, 1μ, 5μ, etc.), along with particle distribution (number of each particles in the size buckets in comparison to the total number of particles per unit volume), D50 also known as the mean particle size, maximum particle size, amount & type of agglomerates, amount and type of aggregates, and a few others. The majority of end users (CMP groups) find that practically, the particle size and distribution are the easiest to measure, and hence to correlate to defect in the wafer resulting from large particles, or too much fines (undersized particles), shifts in D50 or max particle size. These have been directly traced to defects in wafers and loss of revenue.

Thus, the method of using the apparatus 100 utilizes the existing energy available in the recirculating raw slurry stream (as provided by the recirculating pump 320) to mix the slurry in order to reduce or virtually eliminate shearing of the particles (changing distribution and creating fine particles). Since the slurries in use are constantly changing to meet market demand (for example, the latest iPhones and Galaxy's) the number of particles per unit volume has risen from 2-3 million/cc to 5-6 million/cc. These are sometimes also known as nano-slurries. Thus, the method as described above is designed to maintain the supplier's initial size and distribution characteristics.

In another embodiment, the recirculation system with the apparatus 100 may be mounted on the top of a tank, for example, a 265 L tank with a conical bottom to maintain homogeneity. The tank may be, for example, a "day tank" from which other systems are fed the slurry. The apparatus 100 will assist with continuing to mix the slurry to maintain a homogeneous state of the slurry while in the "day tank." When a "day tank" is used the length of the first portion 116 of the apparatus 100 may vary based on the size of the tank. In addition, the length of the second portion 118 of the apparatus 100 may also vary based on the size of the tank. For example, the larger the tank the longer the first portion 116 and the second portion 118 may be.

In yet another embodiment, the recirculation system with at least one apparatus 100 may be mounted on top of a "day tank" which may be, for example, at least a 500 L tank with a conical bottom unit. The at least one apparatus 100 will assist with continuing to mix the slurry to maintain a homogeneous state of the slurry while in the "day tank." The method of using at least one apparatus 100 mounted on the top of a "day tank" may include mixing in additional drums of slurry to the large tank to maintain a desired level in the tank. When additional drums of slurry are added to the large tank the at least one apparatus 100 allows for the new slurry to be mixed with the existing slurry to spread any minor variations between drums of slurry over a larger volume to significantly reduce the risk of dramatic changes in material, for example, particle size distribution, pH, density, and the like. The incorporation of any variations throughout the larger volume may allow for defects to be avoided or in the worst case make the issue minor enough that the wafer can be saved through a re-working process.

The method of using a larger tank may include inserting more than one apparatus 100 into the tank in order to maintain the mixing in the larger tank. For example, for a 500 L tank, the recirculation line may be split and couple to two apparatus 100 providing for two nozzles 188. The two nozzles 188 may be, for example, spaced 180° apart in order to maintain the mixing in the larger tank. In addition, the length of the two apparatus 100 may, for example, vary with one apparatus 100 being longer than the second apparatus 100. With the two different length apparatus 100, the method may include using both nozzles 188 when the tank is full and then turning off flow to at least one of the two nozzles 188 when the level of slurry in the tank drops below a specified level. The ability to adjust the number of nozzles 188 which the slurry is flowing through based on the level of slurry in the tank allows the user to avoid over mixing the slurry and preserve slurry health. In other large tanks, it is also contemplated that more than two apparatus 100 may be included to achieve the necessary mixing. For tanks with more than two apparatus 100, the nozzles 188 may be, for example, radially spaced around the tank to achieve the maximum effect and desired mixing. In the embodiments with more than two nozzles 188, the lengths of some of the apparatus 100 or all of the apparatus 100 may vary to allow for nozzles 188 to be turned off depending on the level of slurry in the tank.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The invention has been described with reference to the preferred embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the invention be construed as including all such modifications and alterations.

Having thus described the preferred embodiments, the invention is now claimed to be:

1. A system for recirculating fluids, the system comprising:

a storage drum containing a semiconductor slurry; and an apparatus, including a base portion;

an inlet portion coupled to a first end of the base portion, the inlet portion being in fluid communication with the storage drum and configured to receive the semiconductor slurry from the storage drum; and a nozzle coupled to a second end of the base portion and located to recirculate the semiconductor slurry into the storage drum, the nozzle comprising:

a nozzle base portion;

a nozzle inlet at a first end of the nozzle base portion; and a nozzle portion that extends away from an exterior surface of the nozzle base portion between the first end and a second end of the nozzle base portion, wherein the nozzle portion comprises a helical groove extending from a position near the nozzle base portion to a position near a tip of the nozzle portion.

2. The system of claim 1, wherein the base portion comprises:

a first portion;

a second portion coupled to the first portion, wherein the first portion is at an angle with respect to the second portion.

3. The system of claim 2, wherein the angle of the first portion with respect to the second portion is between 90 degrees and 160 degrees.

4. The system of claim 2, wherein the base portion further comprises:

a connector coupled to the first portion on a first end and the second portion on a second end.

5. The system of claim 4, wherein the base portion is angled at the connector.

6. The system of claim 2, wherein the inlet portion comprises:

a first inlet portion;

a second inlet portion; and an inlet connector with a first end and a second end, wherein the first end is received within the first inlet portion and the second end is received within the second inlet portion to couple the first inlet portion to the second inlet portion.

7. The system of claim 6, wherein the first inlet portion is tapered from a first end to a second end.

8. The system of claim 6, wherein the inlet connector has an outer diameter smaller than an outer diameter of the first inlet portion and an outer diameter of the second inlet portion.

9. The system of claim 1, wherein the nozzle portion tapers as it extends away from the second end of the nozzle base portion to a tip.

10. The system of claim 1, wherein the helical groove extends from an exterior surface through the nozzle portion to an interior surface of the nozzle portion.

11. The system of claim 2, further comprising:

a coupler coupled to a second inlet portion on a first end and the first portion of the base portion on a second end.

12. The system of claim 11, wherein the coupler comprises:

a first coupler portion;

a second coupler portion; and a connector with a first end and a second end, wherein the first end is received within the first coupler portion and the second end is received within the second coupler portion to couple the first coupler portion to the second coupler portion.

* * * * *